Jan. 13, 1931.  A. V. LIVINGSTON  1,789,145

REGULATING APPARATUS

Filed May 28, 1926

Alan Varley Livingston INVENTOR.

BY

Robert S. Blair ATTORNEY.

Patented Jan. 13, 1931

1,789,145

UNITED STATES PATENT OFFICE

ALAN VARLEY LIVINGSTON, OF NEW HAVEN, CONNECTICUT, ASSIGNOR TO THE SAFETY CAR HEATING & LIGHTING COMPANY, A CORPORATION OF NEW JERSEY

REGULATING APPARATUS

Application filed May 28, 1926. Serial No. 112,370.

This invention relates to regulating apparatus for electric systems of distribution, and particularly to such systems in which a variable speed generator is connected to supply current to a storage battery and to appropriate translating devices, such as electric lamps, for example.

One of the objects of this invention is to provide a simple and thoroughly practical system of electrical distribution in which the current supplied to the current consuming device, such as a storage battery or lamps, for example, may be dependably and reliably controlled. Another object is to provide a system of the above nature in which an accurate and rapidly acting rectification of changes in the electrical conditions of the circuit due, for example, to changes in speed of the generator, may be brought about. Another object is to provide regulating apparatus for systems of the above-mentioned character in which a high degree of sensitiveness may be achieved without sacrificing simplicity of construction or thorough dependability of action. Another object is to provide a regulating apparatus embodying a pressure responsive carbon pile resistance in which relatively large forces may be made effective to control the pressure thereon even though relatively slight changes in the electrical conditions take place, in order thereby to bring about close and sensitive regulating action. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

Figure 1:
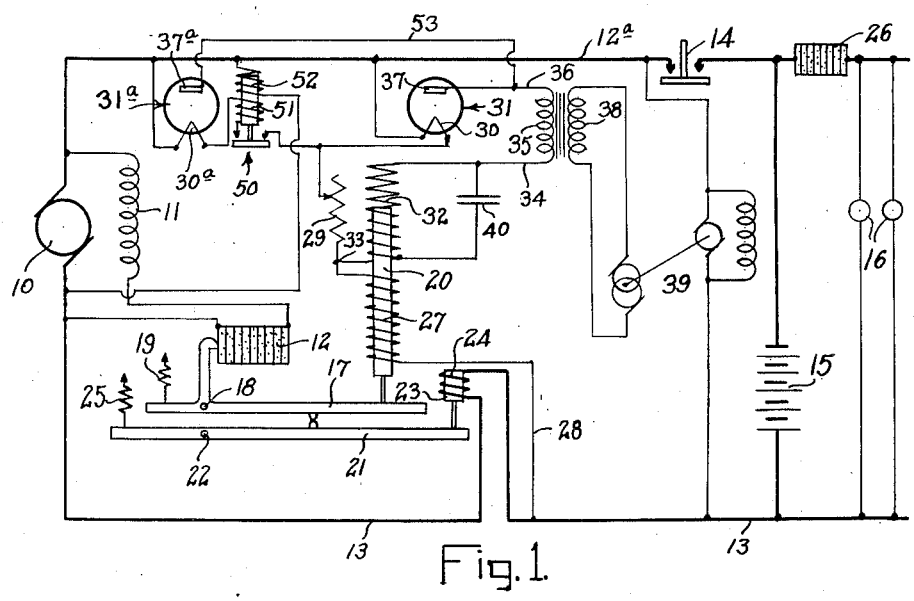
Figure 2:
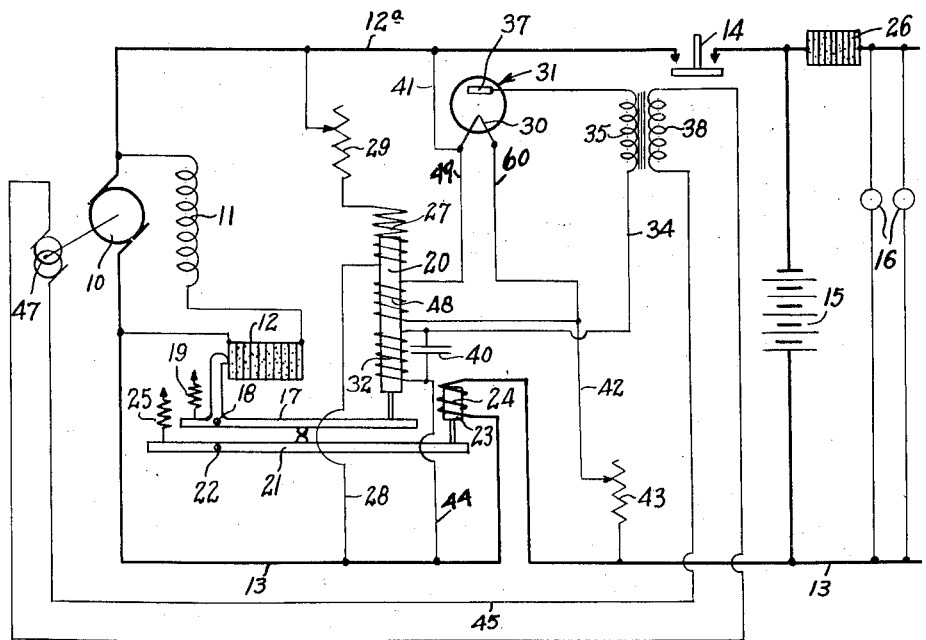

In the accompanying drawing, in which are shown several of various possible embodiments of certain of the electrical features of my invention, Figure 1 represents diagrammatically the circuit arrangements of a system and apparatus illustrative of a car lighting system, in which the generator may be driven from a car axle, and Figure 2 is a like diagrammatic representation of the circuit arrangements of a preferred embodiment of my invention.

Similar reference characters refer to similar parts throughout the several views of the drawing.

Referring now to the drawing, and more particularly to Figure 1, there is shown at 10 a generator adapted, for example, to be driven at variable speed as from the axle of a car; the generator 10 is provided with a field winding 11 in circuit with which is a variable resistance 12 preferably taking the form of a pressure responsive carbon pile. The generator 10 is connected by the main line conductors 12a and 13, through an automatic switch 14 to supply current to a storage battery 15 and to lamps 16 or other translating devices. The automatic switch 14 is merely diagrammatically represented in the drawing and may take any suitable form adapted to be closed upon the voltage of generator 10 reaching a predetermined or appropriate value and to be opened when the speed of the generator reduces to such an extent as to diminish the voltage to a predetermined minimum.

The carbon pile 12 has operative upon it a bell crank lever 17 pivoted as at 18, a spring 19 being connected to tend to hold the carbon pile 12 under compression. Opposing the action of the spring 19 is a solenoid having a core 20 connected to the other end of the bell crank lever 17 and having its windings composed of appropriate coils to be hereinafter more clearly described.

Another lever 21 pivoted as at 22 has operative upon it at one end thereof a solenoid, the core 23 of which is adapted to be controlled by a current coil 24 inserted directly in one of the main line conductors, such as the conductor 13. A spring 25 connected to the lever 21 opposes the action of the solenoid 23—24.

The lever 21 is so arranged with respect to the lever 17 that, upon the current through the coil 24 increasing to a predetermined extent, the coil 24 will be operative to control the pressure on the carbon pile 12, the lever 21 acting upon the latter through the lever 17 with which it may interengage. Such action of the solenoid 23—24 may be carried on to limit the output of the generator or maintain it substantially constant throughout speed changes of the generator 10, for example, when the storage battery 15 is in a relatively low state of charge and is receiving charging current from the generator. As the battery 16 approaches full charge, however, the voltage of the generator increases due to the increasing back voltage of the battery and to prevent over-charge of the battery, the windings associated with the core 20 become effective at a voltage commensurate with that corresponding to substantially full charge of the battery and thereupon become effective to prevent further increase of the voltage of the generator, causing the charging current supplied to the battery to taper off and thus to protect the battery 15 against overcharge.

A suitable regulator generally indicated at 26 may be interposed between the battery 15 and the lamps 16 to maintain substantially constant the voltage across the lamps 16 throughout changes in the voltage of the battery itself.

Considering now the coils operative upon the core 20 for controlling the regulator 12 to maintain substantial constancy of voltage of the generator 10, it may first be noted that there is provided a coil 27 one terminal of which is connected by conductor 28 to one of the main line conductors, such as the conductor 13; the other terminal of the coil 27 is connected to the other side of the generator 10 or to the main line conductor 12a but through a variable resistance 29 and through the filament 30 of a thermionic device generally indicated at 31 and being preferably of the two-element type. The coil 27 therefore will be seen to be responsive to changes in voltage across the main line conductors 12a and 13, due, for example, to changes in speed of the generator 10. Similarly, also, it will be seen that the heating of the filament or cathode 30 of the thermionic device or vacuum tube 31 will be likewise variable with changes in the voltage of the generator 10.

About the core 20 and adapted to coact with the coil 27 is a coil 32 one terminal of which is connected, as at 33, to be maintained at a potential substantially that of the cathode 30; the other terminal is connected by conductor 34 to one terminal of the secondary winding 35 of a transformer, the other terminal of which is connected by conductor 36 to the anode or plate 37 of the thermionic device 31.

The primary winding 38 of the transformer is supplied with an alternating current from a converter or motor generator generally indicated at 39 and connected across the main line conductors 12a and 13 so that changes in potential across the latter will likewise affect the alternating potential supplied the primary winding 38 of the transformer 35—38. The potential of the converter and the ratio of transformation of the transformer 35—38 is such that there is impressed in the plate circuit of the thermionic device 31, and hence in the circuit of the coil 32, a suitable and relatively high potential. In order to smooth out the half waves of the alternating current flowing in the plate circuit of the thermionic device, and thus to give the coil 32 a more steady action, a condenser 40 is bridged across the terminals of the latter coil.

The coils 27 and 32 and the parts coacting therewith are so proportioned with respect to the tension of the spring 19 (which opposes the action of the coils 27 and 32) that the tension of the spring 19 is not overcome until substantially the intended maximum voltage desired to be maintained in the system is achieved by the generator 10; where the storage battery 15 is desired to be protected against over-charge, as has hereinbefore been pointed out, this voltage at which these coils become effective to control the operation of the carbon pile regulator 12 is substantially that voltage at which it is desired to "float" the battery across the generator and which, as will be understood, causes the charge to the battery to be cut down or taper off.

Preferably, the winding 27 is proportioned with respect to the winding 32 so that it contributes about 75% of the required ampere-turns (or pull) at the desired voltage for obtaining the maintenance of the voltage desired. As changes in voltage occur, due to changes in the speed of the generator 10, like changes in the pull of the coil 27 take place with corresponding contribution to the effect on the carbon pile regulator 12, but at the same time the changes in voltage are made effective to substantially correspondingly change the heating of the cathode or filament 30 of the thermionic device 31. The conductive path between the cathode 30 and the anode or plate 37, supplied with electrons emitted by the cathode 30, will be seen to be included in the circuit of the coil 32.

But the change in the heating of the cathode 30 brings about a very much greater change in the conductivity of the electron path within the thermionic device, so that, assuming a voltage increase to have taken place, the corresponding increase in heating of the cathode 30 brings about a very much greater increase in the current flow in the circuit of the coil 32, supplied from the secondary winding 35 of the transformer 35—38. At the same time, however, the same voltage increase, thus assumed, brings about a corresponding increase in the potential of the output of the converter 39 with a substantially commensurate increase in the potential effective in the output circuit of the thermionic device 31. The voltage increase across the generator 10 is thus made to increase to a very much greater extent the energization of the coil 32, so that, with the coil 27, the opposing action of the spring 19 may be quickly and powerfully overcome to affect the regulator 12 and thereby to restore the voltage of the generator to normal.

Vice versa, should a decrease in the voltage across the generator 10 take place, such a decrease will affect the coil 27 in direct proportion but will be made to diminish the strength of the coil 32 in a relatively large disproportion, so that the spring 19 may quickly and, due to the rapid diminution of its opposing forces, increase the pressure on the carbon pile regulator 12 and thus bring the voltage of the generator back to normal.

It will be understood that I prefer to employ a suitable damping device, such as a dash-pot, for example, to steady the movements of the levers, and that, by the term "quickly" as herein employed, I mean to include such a character of action as avoids sluggishness in response of the apparatus and without necessarily implying high speed of action. For example, a distinct advantage achieved by my invention as a result of such "quick" action is the following:—Due to friction, inertia of moving parts, and the like, and to magnetic hysteresis, and because of variations in tension of the spring, and like factors, regulators of the usual type oftentimes respond to changed conditions, such as are due to changes in speed or load of the generator, so sluggishly that the intended or desired standard is restored only after relatively substantial periods of time; thus, a regulator set and adjusted to maintain 40 volts on the system, may, after a change in conditions has taken place, be maintaining 39 or 41 volts and will approach or reach the intended standard of 40 volts only after relatively substantial periods.

By reason of the features of my invention, however, such sluggishness in action is avoided, and a prompt return to the intended standard of operation or regulation insured; this is in part due to the fact that a given departure from the intended standard of regulation is made, by reason of the characteristics of the thermionic device, to bring about a powerful actuation of the regulating apparatus, and this powerful action is sufficiently great to overcome promptly the effects of such delaying factors as friction, inertia of moving parts, magnetic hysteresis, and the like, and great closeness of regulation achieved. This closeness of regulation may be of importance where, for example, as in the illustrative embodiment of certain features of my invention, a storage battery is intended to be protected against over-charge, since, as is known in the art, relatively slight differences or changes in voltages between that of the source of charging current and that due to the back-voltage of the storage battery, may cause relatively greater changes in the charging current.

Among other advantages achieved by virtue of my invention may be noted also the following:—Because of the powerful response in the regulating apparatus brought about by reason of the action of the thermionic device, important commercial or production advantages are achieved; for example, it becomes possible to permit relatively wider or greater variations from the specifications for the various parts of the regulating apparatus. Thus, where a spring is used to oppose the action of the solenoid or solenoid, upon the lever acting on the carbon pile, it is, in the usual practice, highly desirable to have the opposing action of the spring substantially uniform and constant throughout its range of action; the spring therefore has to be carefully designed and constructed, but I am enabled to permit much wider latitude to be exercised in the construction of the spring, for the action of the thermionic device amply as well as powerfully compensates for or counteracts variations due to differences in action of the spring throughout its range. Substantially the same advantageous conditions, as to construction and production of other parts, exist with respect to the latter, so that the expense of production is reduced and speed of production increased.

The resistance 29 is intended mainly for adjustment of the action of the apparatus, particularly for the adjustment or setting of the heating of the filament 30 of the thermionic device 31. The characteristics of the latter, as they will be clear in their effect upon the apparatus from what has hereinbefore been set forth, act also to reduce the effects of changes in the action of the coil or coils, due to changes in the temperature thereof. It may be desirable, however, to construct the resistance 29 to have some temperature compensating effect, the magnitude of which may depend upon the relative proportions between the coil 27 and the coil 32. As is made clear herein, this proportion may be varied throughout wide ranges and the coil 27, under certain conditions, may be entirely omitted.

Referring again to Figure 1, I have illustrated a possible means for safeguarding the apparatus and system against the burning out of the filament 30 of the thermionic device 31. As shown in Figure 1, I include in the system at least one additional thermionic device 31a, it being understood, however, that any desired number of these devices may be related to each other as may be desired, and as will be clear from the relation between the illustrated single additional device 31a with respect to the remaining parts of the apparatus and system. The filament 30a of the supplementary device 31a is connected, as will be seen, substantially in parallel with the filament 30, but through the contacts of the relay generally indicated at 50. The circuit of the filament 30a will be seen to be as follows:—from the main line conductor 12a, thence through the filament 30a, coil 51 of the relay 50, contacts of the relay 50, thence through adjustable resistance 29, coil 27, and thence by way of conductor 28 to the other main line conductor 13. A voltage responsive coil 52 is operative upon the movable member of the relay 50, which may be of the solenoid type, for example, and this coil 52 is bridged across the generator 10 so as to be responsive to the voltage thereof. The relay 50 is constructed or adjusted, however, so that at the normal voltage of the system, the coil 52 is insufficiently energized to close the relay contacts and hence to close the circuit of the filament 30a.

Assuming now that the thermionic device 31 becomes inoperative, for example due to the burning out of the filament 30 thereof, the coil 32 is made ineffective to take part in the regulation of the generator and the voltage of the latter therefore increases beyond the intended or desired value. Such an increase in the voltage, however, sufficiently energizes the coil 52 of relay 50 and the circuit of the filament 30a of the thermionic device 31 is at once closed, the resultant current flow through the holding coil 51 acting to assist the coil 50 in holding the relay closed.

The plate 37a of the supplementary thermionic device 31a is connected through conductor 53 to the terminal of the transformer secondary 35 to which the plate 37 of the initial thermionic device 31 is connected. The device 31 is thus automatically placed in condition to make the coil 32 effective and the apparatus thereupon promptly restores the voltage of the system to normal and proceeds to maintain the voltage at the desired value. The consequent reduction in the energization of the closing coil 52 of the relay 50, however, is prevented from permitting the relay 50 to open, since the current flowing to the filament through the holding coil 51 supplements the holding action of the coil 52, and the relay remains closed.

Thus, the apparatus and system is safeguarded against failure of the thermionic device, and it will be seen that an operative device is promptly substituted for one that has failed and the apparatus and system safeguarded in substantially the intended manner as hereinbefore described. It will be understood, furthermore, that any number of supplementary devices may be embodied in the system and apparatus so that the failure of one is made to connect into the circuit a subsequent one, and that the arrangement shown in Figure 1 is merely illustrative of how this may be carried out.

Such thoroughly practical advantages as those illustratively mentioned hereinabove, I may also, and in some respects prefer to, achieve with the illustrative system and apparatus of Figure 2, in which I have illustrated a preferred embodiment of my invention. The voltage responsive coil 27, however, is connected directly across the main line conductors 13 and 12a by way of the conductor 28 and adjusting resistance 29. The filament or cathode 30 of the thermionic device 31 is connected by conductor 41 to one side of the generator and by conductor 42 but through an adjusting resistance 43 to the other side of the generator. Both the coil 27 and the heating of the cathode 30 will be, as is true of the arrangement above described in connection with Figure 1, proportional to or responsive to changes in the voltage of the generator 10. The plate circuit of the thermionic device 31 will be seen to include the electron path between the cathode 30 and the plate 37, conductor 36, secondary winding 35 of the transformer 35—38, conductor 34, winding 32 (coacting with the coil 27 about the core 20), conductor 44 and thence by way of the main line conductor 13, resistance 43 and conductor 42, back to the cathode 30 of the thermionic device 31. A condenser 40 is bridged across the coil 32.

The primary winding 38 of the transformer 35—38 is supplied with an alternating potential by way of conductors 45 and 46 which lead to a pair of slip rings 47 diagrammatically illustrated as being embodied with the armature of the generator 10, it being understood that while the latter may have its armature winding connected to a commutator to supply direct current to the system, such windings may likewise be connected in any suitable way to the slip rings to supply an appropriate alternating potential, which will of course vary with changes in D. C. voltage due to changes in speed of the generator, for example.

About the core 20 is an additional winding 48 which is connected by conductors 49 and 60 in shunt relation to the cathode 30 of the vacuum tube 31. The resistance of winding 48 is relatively high with respect to the resistance of the filament 30 so that, while the apparatus is normally operating, the winding 48 is substantially short-circuited by the filament 30 and a relatively small and substantially negligible amount of current flows through the coil 48.

The operation of the apparatus and system of Figure 2, as thus far described, will be clear from what has been set forth in connection with Figure 1; it may be noted, however, that the coil 27 will take part in the operation of the carbon pile regulator 12 when changes in voltage of the generator take place and that the heating of the filament 30 will likewise be responsive to such voltage changes. Similarly, also, the potential effective in the plate circuit of the vacuum tube 31 will likewise vary with changes in D. C. voltage due to changes in speed of the generator so that disproportionately greater changes in the energization of the coil 32 take place, with consequent rapid and powerful actuation of the regulator. During the period of voltage regulation, as when the battery is being floated across the generator, the apparatus will thus continue to function.

Should, however, the thermionic device 31 and its associated plate circuit with the coil 32 included therein become inoperative, due to the burning out of the filament cathode 30, the effectual short-circuit about the auxiliary or emergency coil 48 becomes removed so that the latter coil is at once brought into operation.

The coil 48, moreover, is so proportioned that, when brought into operation as above described, it contributes an effective magneto-motive force toward the control of the carbon pile regulator 12 substantially equivalent to that theretofore supplied by the coil 32. While the failure of the thermionic device and its associated circuit or circuits would thus deprive the apparatus and system of the advantages hereinbefore pointed out, yet the automatic substitution of the emergency coil 48 for the ineffective coil 32 prevents the voltage of the generator from exceeding the desired value and thus the system is dependably safeguarded against undesired increases in voltage.

The resistances 29 and 43 will be understood to be for the purpose of adjustment or predetermination of the setting of the coil or coils or of the parts operative in the circuit in which the respective resistances are included. These resistances need not act as temperature compensating resistances; as will be clear from what has been hereinbefore said with respect to Figure 1, however, resistance 29 may.

It may also be noted that the thermionic device or vacuum tube 31 is operated at such a part or parts of its characteristic or characteristics as falls below the saturation point or as is substantially below the knee in the characteristic curve; thereby the disproportionately large changes, as hereinabove set forth, may be more effectively achieved. The variable resistances in circuit with the filament or heated electrode of the thermionic device may also be employed to insure the operation of the thermionic device throughout an appropriate portion of its characteristic curve.

It may furthermore also be pointed out that, while the coil 27 may be and preferably is adapted to supply about 75% of the magneto-motive force for operation on the core of the solenoid, yet this proportion may be varied or changed as may be desired, and under certain conditions of use, it may be desirable to dispense entirely with the coil 27 in which case the remaining coil or coils are adapted to supply the entire pull or magneto-motive force for operating the regulator.

It will thus be seen that there has been provided in this invention a system and apparatus in which the various objects of this invention as well as many thoroughly practical advantages are successfully achieved. It will be seen that the apparatus is not merely very sensitively responsive to changes in the electrical conditions of the circuit, but also that relatively small fluctuations or changes are made effective to bring about the rapid and powerful actuation of the carbon pile regulator with resultant rapid rectification of the electrical conditions in the system. It will moreover be seen that the apparatus is of a thoroughly practical nature and is well adapted to meet in a thoroughly efficient manner not merely the widely varying conditions of hard practical use, but also to meet in a thoroughly dependable way possible failures of part of the apparatus itself.

As many possible embodiments may be made of the above invention, and as many changes might be made in the embodiment above set forth, it is to be understood that all matters hereinbefore set forth or shown in the accompanying drawing is to be interpreted as illustrative and not in a limiting sense.

I claim as my invention:

1. In apparatus of the character described, in combination, a source of current, a work circuit adapted to be supplied with current from said source, a regulator for controlling a function of the current flowing from said source to said work circuit, and means for controlling the operation of said regulator, said means including a coil responsive to a function of the current supplied to said work circuit, a thermionic device having a heated electrode arranged so that the heating thereof is responsive to a function of said current and a coacting electrode, a coil in circuit with said two electrodes for coaction with said first-mentioned coil, and means responsive to inoperative condition of said heated electrode for coaction with said first-mentioned coil upon said second-mentioned coil being made ineffective due to failure of said heated electrode.

2. In apparatus of the character described, in combination, a source of current, a work circuit adapted to be supplied with current from said source, a regulator for controlling a function of the current flowing from said source to said work circuit, and means for controlling the operation of said regulator, said means including a coil responsive to a function of the current supplied to said work circuit, a thermionic device having a heated electrode arranged so that the heating thereof is responsive to a function of said current and a coacting electrode, a coil in circuit with said two electrodes for coaction with said first-mentioned coil, and a coil adapted for coaction with said first-mentioned coil and connected in shunt relation with said heated electrode adapted to be substantially ineffective when said heated electrode is effective and to become active for coaction with said first-mentioned coil upon failure of said heated electrode to make effective said second-mentioned coil.

3. In apparatus of the character described, in combination, a source of current, a work circuit adapted to be supplied with current from said source, a regulator for controlling a function of the current flowing from said source to said work circuit, and operating means for said regulator, said means including a coil, a thermionic device for controlling the flow of current through said coil, separate means for operating said regulator, means for causing said last-mentioned operating means to become effective upon said first-mentioned operating means becoming ineffective.

4. In apparatus of the character described, in combination, a source of current, a work circuit adapted to be supplied with current from said source, a regulator for controlling a function of the current flowing from said source to said work circuit, and operating means for said regulator, said means including a coil, a thermionic device for controlling the flow of current through said coil, an additional coil for operating said regulator, means for causing said last-mentioned coil to become effective only upon failure of said thermionic device.

5. In apparatus of the character described, in combination, a generator, regulating means therefor including a variable resistance, and means responsive to a function of the output of said generator for controlling said variable resistance, said means including a thermionic device and a source of potential responsive substantially to changes in the condition of operation of said generator, said means adapted upon a change in the function of the output of said generator to cause a disproportionately greater change in said variable resistance.

6. In apparatus of the character described, in combination, a generator, a variable resistance regulator therefor, and means for controlling changes in resistance of said regulator, said means including a device having a heated electrode adapted to have the heating thereof responsive to changes in a function of the output of said generator and having a coacting anode, means responsive to changes in a function of the output of said generator for impressing a relatively high potential upon said anode, and electromagnetic means responsive to the resultant changes in conductivity of the electron path between said heated electrode and said coacting anode.

7. In apparatus of the character described, in combination, a generator, a variable resistance regulator therefor, means for controlling said regulator, said means including a device having a heated electrode connected so that the heating thereof is responsive to changes in a function of the output of said generator, a coil responsive to the changes which affect the heating of said electrode, a second coil cooperating with said first-mentioned coil, said device having an anode cooperating with said heated electrode and in circuit with said second-mentioned coil, and means responsive to the energization of said coils for affecting said variable resistance regulator.

8. In apparatus of the character described, in combination, a source of current, a work circuit adapted to be supplied therefrom, a variable resistance regulator for controlling the voltage impressed upon said work circuit, means for controlling said regulator, said means including a coil, a device having a heated electrode, the heating of which is responsive to changes in voltage impressed upon said circuit, said device having an anode coacting with said heated electrode and said coil being connected to include in its circuit the electron path between said two electrodes, and means supplying a suitable potential derived from said source of current, said means being included in said last-mentioned circuit.

9. In apparatus of the character described, in combination, a source of current, a work circuit adapted to be supplied therefrom, a variable resistance regulator for controlling the voltage impressed upon said work circuit, means for controlling said regulator, said means including a coil, a device having a heated electrode, means connecting said electrode to be responsive to changes in voltage across said work circuit, and an anode coacting with said electrode, said coil being connected in a circuit in which is included the electron path between said two electrodes, and means responsive to changes in voltage across said work circuit for impressing a suitable potential in the circuit of said coil.

10. In apparatus of the character described, in combination, a variable speed generator, variable resistance regulating means therefor, and means for controlling said regulating means, said controlling means including a coil, an electronic conduction device having electrodes and the electron path therebetween in circuit with said coil, and means forming a source of relatively high potential operative to affect the conductivity of said electron path and responsive to speed changes of said generator.

11. In apparatus of the character described, in combination, a variable speed direct-current generator, regulating means for controlling the direct-current output thereof, electromagnetic means for operating said regulating means, an electronic conduction device having spaced electrodes between which conduction may take place for controlling the current to said electromagnetic means, means connecting said device to be responsive to speed changes of said generator, a source of alternating current and a transformer for impressing a suitable potential in the output circuit of said device.

12. In apparatus of the character described, in combination, a variable speed direct-current generator, a regulator for controlling the direct-current output thereof, and means for controlling said regulator, said means including a coil, a thermionic device having a heated cathode and a cooperating anode, said coil being in a circuit in which is included the electron path between said two electrodes, and means associated with said generator for supplying an alternating potential variable with the speed of said generator and effective upon the circuit of said coil.

13. In apparatus of the character described, in combination, a variable speed direct-current generator, a regulator for controlling the direct-current output thereof, and means for controlling said regulator, said means including a coil, a thermionic device having a heated cathode and a cooperating anode, said coil being in a circuit in which is included the electron path between said two electrodes, means associated with said generator for supplying an alternating current variable substantially with the speed of the generator, and a transformer for impressing a suitable function of said alternating potential upon the circuit of said coil.

14. In apparatus of the character described, in combination, a source of current, a work circuit adapted to be supplied therefrom, a carbon pile for controlling a function of the current supplied to said work circuit, a plurality of coils for affecting said carbon pile, one of said coils being connected to be responsive to a function of the current flowing to said work circuit, a thermionic device having a heated electrode connected to be responsive to a function of said current and having a coacting anode in circuit with another of said coils, and the third of said coils being connected to become effective upon said thermionic device becoming inoperative.

15. In apparatus of the character described, in combination, a source of current, a work circuit adapted to be supplied therefrom, a carbon pile for controlling a function of the current supplied to said work circuit, a plurality of coils for affecting said carbon pile, one of said coils being connected to be responsive to a function of the current flowing to said work circuit, a thermionic device having a heated electrode connected to be responsive to a function of said current and having a coacting anode in circuit with another of said coils, and the third of said plurality of coils being connected in shunt relation to the heated cathode of said device so that it becomes operative when said cathode becomes ineffective.

16. In apparatus of the character described, in combination, a source of current, a work circuit adapted to be supplied therefrom, a carbon pile for controlling a function of the current flowing to said work circuit, and means for controlling said carbon pile, said means including a coil, a device having spaced electrodes and an ionic current conducting path therebetween and in circuit with said coil, said device being connected so that the conductivity of said ionic path is varied disproportionately greater than changes in a function of the current flowing to said work circuit, and electro-responsive means for affecting said carbon pile and connected to become effective when said device becomes inoperative.

17. In apparatus of the character described, in combination, a regulator, means including a coil for operating said regulator, a device having spaced electrodes between which conduction takes place for affecting said coil, and means for maintaining said regulator and operating means therefor effective upon failure of said device.

18. In apparatus of the character described, in combination, a compressible carbon pile regulator, and means for controlling the pressure upon said pile including thermionic means arranged to be responsive to changes in the electrical conditions of the circuit which said regulator is adapted to rectify, said thermionic means having an output circuit for producing disproportionately greater changes than those which affect said thermionic means, said controlling means including means responsive to the changes in said output circuit.

19. In apparatus of the character described, in combination, a compressible carbon pile regulator, means for controlling the pressure upon said pile including thermionic means arranged to be responsive to changes in the electrical conditions of the circuit which said regulator is adapted to rectify, and means for maintaining effective said controlling means upon failure of said thermionic means.

20. In apparatus of the character described, in combination, a carbon pile regulator in which the resistance to compression increases disproportionately, a device having spaced electrodes between which conduction takes place, said device being arranged to be responsive to changes in the electrical conditions of the circuit which said regulator is adapted to rectify and having the characteristic whereby changes in said conditions cause disproportionately different changes in the conductivity of said device, and means for controlling the pressure upon said carbon pile regulator and responsive to said disproportionately different changes in conductivity of said device.

21. In apparatus of the character described, in combination, a source of current, a work circuit adapted to be supplied therefrom, regulating means including a plurality of coils for controlling a function of the current supplied to said work circuit, one of said coils being connected to be responsive to a function of the current flowing to said work circuit, a device having spaced electrodes between which electronic conduction is adapted to take place and connected to be responsive to a function of said current, said device being connected to affect another of said coils, and means for making another of said plurality of coils effective when said device becomes inoperative.

22. In apparatus of the character described, in combination, a generator, means operative upon the field circuit of said generator for controlling the output thereof, said means being variable in a plurality of increments and including electromagnetic means capable of varying the same in a plurality of increments, an electronic conduction device having electrodes and the electron path therebetween in circuit with said electromagnetic means, means connecting said device to be responsive to a function of the output of said generator, and means operative upon failure of said device for maintaining effective said output-controlling-means.

23. In apparatus of the character described, in combination, a generator, means operative upon the field circuit of said generator for controlling the output thereof, said means including a resistance variable in increments throughout a suitable range and electromagnetic means for varying the same throughout said range, a device having a heated electrode, means causing the heating of said electrode to be responsive to changes in a function of the output of said generator, said device having an anode coacting with said heated electrode, and means connecting said electromagnetic means to said device so that the former is affected by changes in conductivity in the electronic conduction path of the latter.

24. In apparatus of the character described, in combination, a generator having associated therewith means including at least three windings each adapted to affect the output of said generator, an electronic conduction device having a heated electrode and a coacting anode, one of said windings being in circuit with the electron path between said electrode and said anode, means connecting said device to be responsive to a function of the output of said generator, said heated electrode being shunted about another of said windings, said first-mentioned winding coacting with the third of said three windings while the shunt circuit in which said heated electrode is included is effective and said second-mentioned winding coacting with said third winding when the shunt circuit in which said heated electrode is included is ineffective.

In testimony whereof, I have signed my name to this specification this 4th day of May, 1926.

ALAN VARLEY LIVINGSTON.